Dec. 17, 1935.  T. TARISIEN  2,024,669
SPEED CONTROLLED BRAKE
Filed June 16, 1934  2 Sheets-Sheet 1
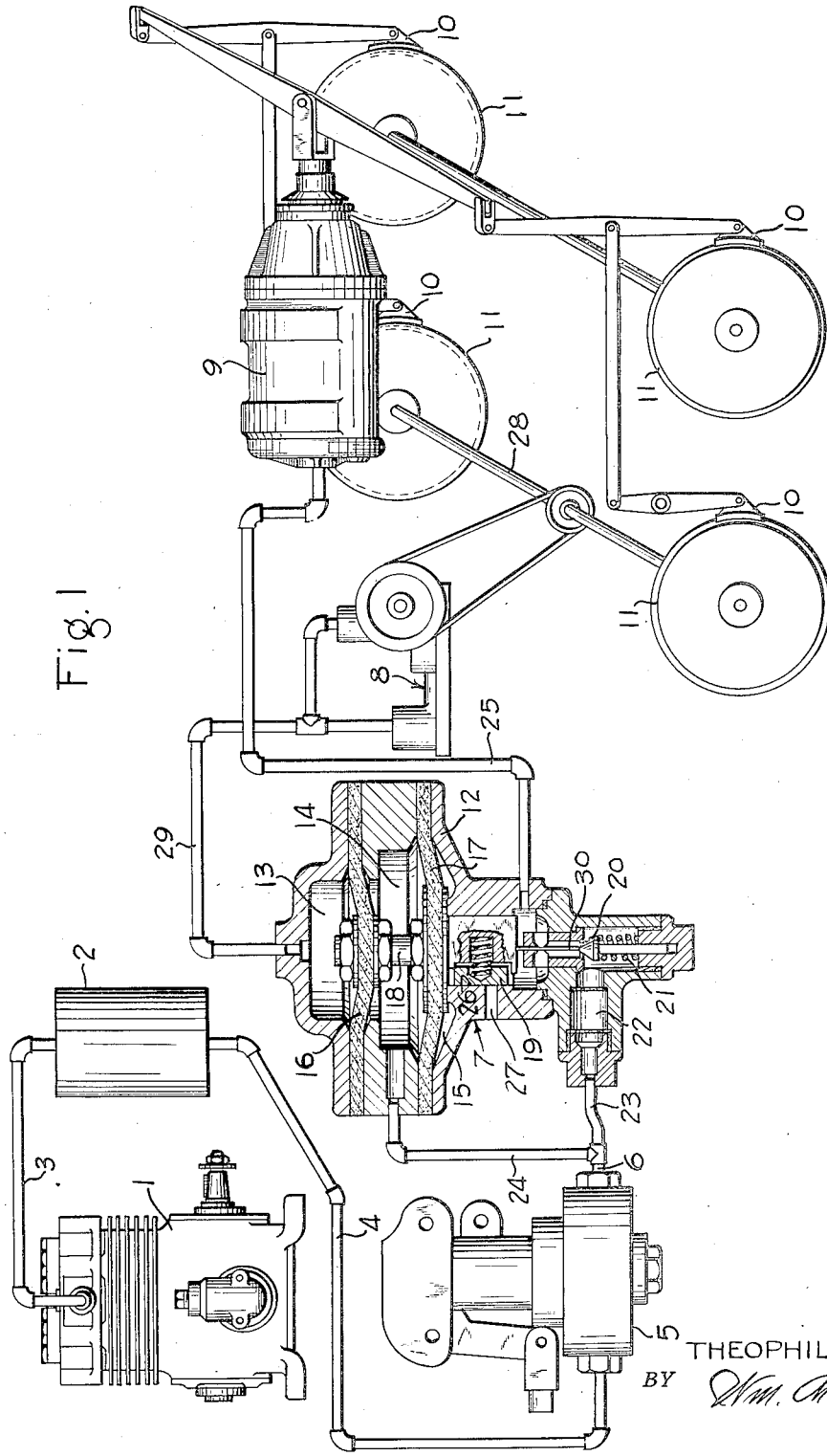
INVENTOR
THEOPHILE TARISIEN
BY Wm. A. Cady
ATTORNEY

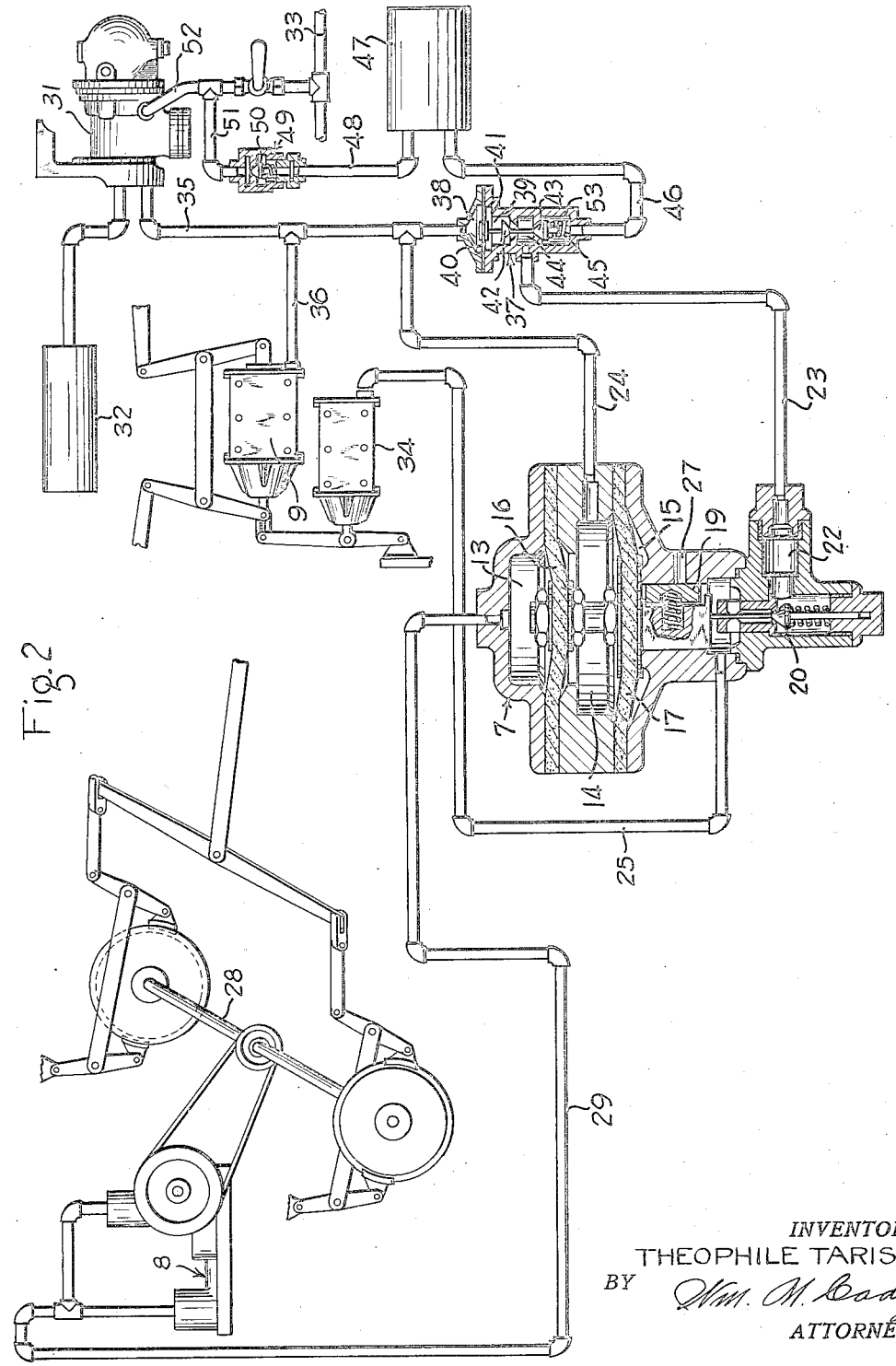

Patented Dec. 17, 1935

2,024,669

UNITED STATES PATENT OFFICE 2,024,669

SPEED CONTROLLED BRAKE

Theophile Tarisien, Livry-Gargan, France, assignor to The Westinghouse Air Brake Company, Wilmerding, Pa., a corporation of Pennsylvania Application June 16, 1934, Serial No. 730,877
In France December 7, 1933

8 Claims. (Cl. 303—21)

This invention relates to fluid pressure braking apparatus for railway or other vehicles of the kind in which the supply of fluid under pressure to and its release from the brake cylinder or cylinders of the apparatus is arranged to be controlled by a brake valve either directly or indirectly by varying the pressure obtaining in a brake pipe, the invention having for its object to provide improved arrangements whereby the braking action obtained by the operation of the brake valve may be controlled in accordance with the speed of the vehicle so as to ensure that the braking effort exerted shall not exceed that corresponding to the maximum coefficient of friction between the brake blocks and the wheels at any speed, and thus prevent the possibility of the wheels becoming locked at any time during the retardation of the vehicle.

In order to bring the vehicle to rest in the shortest possible time, it is essential that the tangential effort exerted upon the vehicle wheels by the action of the brake blocks should remain substantially constant as the speed of rotation varies, and to obtain this result it is evidently necessary that the brake cylinder pressure must be adjusted in accordance with the coefficient of friction obtaining at any time during the retardation, and thus in accordance with the speed of the vehicle.

According to the principal feature of the present invention the pressure obtaining in the brake cylinder during an application of the brakes is arranged to be automatically adjusted in accordance with the speed of the vehicle in such a manner that when an application of the brakes is effected the supply of fluid under pressure to the brake cylinder is automatically cut off as soon as a brake cylinder pressure is established corresponding to the maximum tangential effort exerted upon the vehicle wheels by the brake blocks at the speed of rotation of the wheels at the time of application, the supply of fluid under pressure to the brake cylinder being renewed in the event of a subsequent increase in the speed of rotation, while the brake cylinder pressure is automatically reduced as the speed of rotation decreases.

This control of the braking effort exerted is furthermore arranged to be effected without interfering with the application or release of the brakes to an extent less than that required to produce the maximum retardation above referred to, so that the driver of the vehicle is enabled to retain full control of the braking action while enabling the maximum retardation to be obtained without the possibility of locking the wheels of the vehicle.

The invention is illustrated by way of example in the accompanying drawings,

Figure 1 of which is a diagrammatic view of the invention as applied to fluid pressure braking apparatus of the kind in which the supply of fluid to and its release from the brake cylinder is directly controlled by a driver's brake valve;

Figure 2 being a similar view illustrating the invention as applied to braking apparatus in which the control of the braking action is effected by varying the pressure in a brake pipe under the control of the driver's brake valve.

Referring now first to Figure 1, it will be seen that the apparatus therein illustrated comprises an air compressor 1 of any suitable type, adapted to supply air to a main reservoir 2 through a pipe 3, a pipe 4 leading from the reservoir 2 to a driver's brake valve 5 of any suitable construction, by the operation of which compressed air from the pipe 4 is supplied to a pipe 6 or communication is established between the pipe 6 and the atmosphere. The apparatus shown in Figure 1 also comprises a regulating valve 7, a speed control device 8, and a brake cylinder 9, the latter when supplied with compressed air being arranged to effect the application of brake blocks 10 to the wheels 11 of the vehicle, through any suitable form of brake rigging.

The regulating valve 7 comprises a casing 12, subdivided internally into three compartments indicated at 13, 14 and 15, by means of flexible diaphragms 16, 17, which are connected together by means of a rod or spindle 18 adapted to operate a slide valve 19 arranged in the chamber 15.

The lower part of the casing 12 contains a supply valve 20 of the poppet type, provided with a controlling spring 21, the valve 20 controlling communication between a supply chamber 22 communicating with the pipe 6 by means of a pipe 23 and the chamber 15.

The central chamber 14 of the regulating valve 7 is in communication through a pipe 24 with the pipe 6, the lower chamber 15 being in communication with the brake cylinder 9 by means of a pipe 25. The seat 26 of the slide valve 19 is provided with an exhaust port 27 adapted when uncovered by the slide valve 19 to establish communication between the chamber 15 and the atmosphere.

The speed control device 8 may be constituted by an oil or water pump or other form of compressor driven as indicated from an axle 28 of the vehicle, the fluid pressure developed by the action of the device 8 being transmitted through a pipe 29 to the upper chamber 13 of the regulating valve 7.

The effective area of the diaphragm 16 of the regulating valve 7 is, as illustrated, less than the effective area of the diaphragm 17, and the lower part of the stem 18 carrying the slide valve 19 is adapted under certain conditions to engage with the stem 30 of the supply valve 20 so as to open the latter.

The operation of the apparatus is as follows:

When the vehicle is in motion the operation of the speed control device 8 causes a pressure to be established in the chamber 13 of the regulating valve 7 which is proportional to the speed of rotation of the axle 28, and thus to the speed of the vehicle, and under running conditions with the brakes released the diaphragms 16, 17 and their stem 18 are moved downward from the position shown under the action of the pressure obtaining in the chamber 13 so that the stem 18 engages with the stem 30 of the valve 20 and maintains this valve in its open position against the action of the spring 21.

Under running conditions it will be understood that the pipe 6 is in communication with the atmosphere through the driver's brake valve 5 in the release position of the latter, so that the chamber 14 is at atmospheric pressure, and since the valve 20 is open the brake cylinder 9 is in communication with the chamber 22 which is also in communication with the atmosphere by way of the pipes 23 and 6.

When it is desired to effect an application of the brakes, the driver's brake valve 5 will be operated to cut off communication between the pipe 6 and the atmosphere, and to establish communication between the pipes 4 and 6. Compressed air will, under these conditions, be supplied from the reservoir 2 to the pipe 6 and will flow by way of chamber 22 past the open valve 20 to the chamber 15 and thence by way of pipe 25 to the brake cylinder 9. Compressed air is also supplied from the pipe 6 through pipe 24 to the chamber 14, so that the chambers 14 and 15 are at the pressure obtaining in the brake cylinder.

As the pressure in the brake cylinder 9 increases the pressure in the chamber 14 acting in opposition to the pressure in the chamber 13 will tend to move the diaphragms 16, 17 upward so as to permit the valve 20 to close under the action of its controlling spring 21, but so long as the pressure of the air supplied to the chamber 14 through the driver's brake valve 5 is insufficient to overcome the opposing pressure in the chamber 13 the valve 20 will remain open, so that the pressure in the brake cylinder will be entirely under the control of the driver, who, by operating the brake valve 5 in the usual manner, can effect an increase or decrease in the brake cylinder pressure, or may maintain this pressure at any desired value.

In order to effect the maximum retardation of the vehicle, the driver's brake valve 5 will be maintained in its application position so as to supply compressed air continuously to the pipe 6, and as soon as the pressure obtaining in the chamber 14 exceeds that obtaining in the chamber 13 the diaphragms 16, 17 will be moved from the position shown in Figure 1, to a position in which the supply valve 20 is permitted to close, thereby cutting off the further supply of air to the brake cylinder 9 from the chamber 15.

The value of the brake cylinder pressure at which the further supply of compressed air to the brake cylinder is thus interrupted will evidently depend upon the pressure in the chamber 13, and thus upon the speed of rotation of the axle 28 of the vehicle, and the pressure developed in the chamber 13 by the control device 8 for any given speed of rotation of the axle 28 is so determined that the brake cylinder pressure at the speed at which the braking application is initiated corresponds to the maximum tangential retarding effort upon the vehicle for the coefficient of friction between the brake blocks 10 and the wheels 11 of the vehicle at that speed.

In the event of the speed of the vehicle increasing for any reason after the brakes are thus applied the increased pressure in the chamber 13 will cause the diaphragms 16, 17 again to move downwards, thereby reopening the valve 20 and permitting the further supply of compressed air to the brake cylinder 9 to increase the braking pressure to an extent corresponding to the increased speed.

If, however, as is more usually the case, the speed of the vehicle decreases owing to the application of the brakes the pressure in the chamber 13 will correspondingly decrease with the result that the brake cylinder pressure obtaining in the chamber 15 will cause the diaphragms 16, 17 to move upwards to an extent sufficient to cause the slide valve 19 to uncover the exhaust port 27 and thereby permit the brake cylinder pressure to be reduced by the flow of air through the pipe 25, chamber 15 and exhaust port 27.

The brake cylinder pressure is thus reduced until, owing to the corresponding reduction of pressure in the chamber 15, the diaphragms 16, 17 again move downwards to the position shown, thereby cutting off the further release of air from the brake cylinder, and this action will be continued as the speed of the vehicle decreases so that at all times the brake cylinder pressure corresponds to that required to produce the maximum retarding tangential effort on the vehicle without locking the wheels.

During the retardation of the vehicle as above explained, the driver's brake valve 5 may be operated to reduce the braking action by establishing communication between the pipe 6 and the atmosphere, whereupon the corresponding reduction of pressure in the chamber 14 due to the release of air by way of the pipe 24 will cause the diaphragms 16, 17 to move downwards, thereby opening the valve 20 and permitting the flow of air from the brake cylinder 9 to the atmosphere, under the control of the driver, by way of pipe 25, chamber 15, past the open valve 20, chamber 22 and pipes 23 and 6.

Referring now to the apparatus shown in Figure 2, it will be seen that the supply of fluid under pressure to and its release from the brake cylinder 9 is in this case controlled by means of a triple valve 31 associated with the usual auxiliary reservoir 32 and operated in accordance with the pressure conditions obtaining in a brake pipe 33, the pressure in which is controlled by means of the driver's brake valve, not shown. An auxiliary brake cylinder 34 is provided which is suitably coupled, as shown, to the brake rigging operated by the brake cylinder 9, the brake cylinder 34 being connected by means of a pipe 25 to the chamber 15 of the regulating valve 7.

The apparatus also comprises a speed control device 8 similar to that shown in Figure 1, communicating by means of a pipe 29 with the upper chamber 13 of the regulating valve 7. A pipe 35 leading from the triple valve 31 communicates through a pipe 36 with the brake cylinder 9 and through a pipe 24 with the chamber 14 of the regulating valve 7.

A cut-off valve device 37 is provided comprising an upper chamber 38 communicating with the pipe 35 and separated from a chamber 39 by means of a flexible diaphragm 40, the chamber 39 communicating with the atmosphere through an exhaust port 41. The flexible diaphragm 40 is connected to valves 42, 43 controlling communication respectively between the chamber 39 and a chamber 44, and between this latter chamber and a chamber 45, which communicates by way of a pipe 46 with a supplementary reservoir 47.

The reservoir 47 communicates by means of a pipe 48 with a retaining valve device 49 containing a spring-controlled non-return valve 50 which controls communication between the pipe 48 and a pipe 51 leading to the branch pipe 52 of the triple valve 31; communication between the chamber 44 of the valve device 37 and the supply chamber 22 of the regulating valve 7 is established through the pipe 23.

The operation of this form of the apparatus is as follows:

Under running conditions the supplementary reservoir 47 is charged with compressed air from the brake pipe 33, by way of branch pipe 52, pipe 51, past the valve 50 of the retaining valve 49, and pipe 48.

The brake cylinder 9 being at atmospheric pressure the chamber 38 of the cut-off valve device is also at atmospheric pressure, with the result that the valve 43 is maintained closed and the valve 42 open under the action of the controlling spring 53. The chamber 44 of the valve device 37 and the supply chamber 22 of the regulating valve 7 are thus also in communication with the atmosphere by way of chamber 39 and the exhaust port 41.

So long as the vehicle is in motion, the chamber 13 of the regulating valve 7 is maintained at a pressure corresponding to the speed of the vehicle, and the valve 20 being thus maintained open in the same manner as that already described with reference to Figure 1, the auxiliary brake cylinder 34 is in communication with the atmosphere by way of pipe 25, chamber 15, and supply chamber 22 of the regulating valve 7.

When it is required to effect an application of the brakes, the pressure in the brake pipe 33 is reduced by the operation of the driver's brake valve in the usual manner, so that compressed air is supplied to the brake cylinder 9 from the auxiliary reservoir 32 through the triple valve 31. The pressure obtaining in the brake cylinder 9 is transmitted through the pipe 35 to the chamber 38 of the cut-off valve device 37, and the diaphragm 40 is thereby moved downwards to close the valve 42 and open the valve 43. Communication between the pipe 23 and the atmosphere is cut off by the closure of the valve 42, and the opening of the valve 43 establishes communication between the supplementary reservoir 47 and the pipe 23 by way of pipe 46 and chamber 45. Compressed air is thereupon supplied from the supplementary reservoir 47 through the cut-off valve 37 to pipe 23 and supply chamber 22 of the regulating valve 7, and from the chamber 22 air flows past the open valve 20 to the chamber 15 of the regulating valve 7 and through pipe 25 to the auxiliary brake cylinder 34.

It will thus be seen that the pressure in the chamber 14 of the regulating valve 7 tending to move the diaphragms 16, 17 upwards is the pressure obtaining in the brake cylinder 9, and is thus dependent upon the degree of braking application effected by the action of the triple valve 31.

The pressure in the chamber 15 of the regulating valve 7 tending to move the diaphragms 16, 17 upwards is dependent upon the pressure obtaining in the auxiliary brake cylinder 34, and the supply of air to this brake cylinder is thus controlled by the regulating valve in the manner already described in accordance with the pressure obtaining in the chamber 13 which is in turn dependent upon the speed of the vehicle.

The total braking effort obtained will evidently be due to the sum of the braking efforts of the brake cylinders 9 and 34, the supply of compressed air to and its release from the brake cylinder 9 being under the direct control of the triple valve 31 while the additional braking effort due to the auxiliary brake cylinder 34 is controlled by the regulating valve 7 in such a manner as to be dependent upon the speed of the vehicle during the braking application.

When the brakes are released the brake cylinder 9 is vented through the triple valve 31 in the usual manner and the reduction of pressure in the chamber 38 of the cut-off valve device 37 effects the opening of the valve 42, thereby permitting air to be released from the auxiliary brake cylinder 34 through pipe 25, chamber 15, past the valve 20, supply chamber 22, pipe 23, chambers 44 and 39, and exhaust port 41.

While the invention has been described above as applied to braking apparatus operated by compressed air, it will be evident that by suitable alteration in the construction and arrangement of the regulating valve and of the device by which its controlling pressure dependent upon the speed of the vehicle is obtained, the invention may be applied to vacuum braking apparatus as will be obvious to those skilled in the art.

The invention is evidently not limited to the particular arrangement or construction of the various valve devices above described and illustrated by way of example, and modifications in these and other respects may evidently be made without exceeding the scope of the invention.

Having now described my invention, what I claim as new and desire to secure by Letters Patent, is:

1. In a fluid pressure brake for a vehicle, the combination with a brake cylinder, of manually controlled means for effecting the supply of fluid under pressure to the brake cylinder, means operative to establish a fluid pressure which pressure is proportional to the speed of a vehicle wheel, a brake controlling valve device comprising valve means for controlling the supply of fluid under pressure to the brake cylinder, a first movable abutment subject to the opposing pressures of the brake cylinder and the pressure of fluid supplied to effect an application of the brakes for operating said valve means, and a second movable abutment subject to the opposing pressures of the fluid supplied to effect an application of the brakes and to said fluid pressure which is proportional to the speed of the vehicle, said last named movable abutment also controlling the operation of said valve device.

2. In a fluid pressure brake for a vehicle, the combination with a brake cylinder, of manually controlled means for effecting the supply of fluid under pressure to the brake cylinder, a brake controlling valve device comprising valve means for controlling the supply of fluid under pressure to the brake cylinder, a first movable abutment subject to the opposing pressures of the brake cylinder and the pressure of fluid supplied to effect an application of the brakes for operating said valve means, and a second movable abutment operated by fluid under pressure for also controlling the operation of said valve device, and means controlled according to the speed of a vehicle wheel for varying the fluid pressure on said second abutment, the first abutment being urged by the brake cylinder fluid pressure in a direction to effect movement of the valve means in a direction to cut off the flow of fluid to the brake cylinder.

3. In a fluid pressure brake for a vehicle, the combination with a brake cylinder, of manually controlled means for effecting the supply of fluid under pressure to the brake cylinder, a brake controlling valve device comprising valve means for controlling the supply of fluid under pressure to the brake cylinder, a first movable abutment subject to the opposing pressures of the brake cylinder and the pressure of fluid supplied to effect an application of the brakes for operating said valve means, and a second movable abutment operated by fluid under pressure for also controlling the operation of said valve device, and means controlled according to the speed of a vehicle wheel for varying the fluid pressure on said second abutment, the first abutment being urged by the pressure of fluid supplied to effect an application of the brakes and the second abutment being urged by the fluid pressure which is varied according to the speed of the vehicle wheel in a direction to effect movement of the valve means in a direction to open the communication through which fluid is supplied to the brake cylinder.

4. In a fluid pressure brake for a vehicle, the combination with a brake cylinder, of manually controlled means for effecting the supply of fluid under pressure to the brake cylinder, a brake controlling valve device comprising valve means for controlling the supply of fluid under pressure to the brake cylinder, a first movable abutment subject to the opposing pressures of the brake cylinder and the pressure of fluid supplied to effect an application of the brakes for operating said valve means, and a second movable abutment operated by fluid under pressure for also controlling the operation of said valve device, and means controlled according to the speed of a vehicle wheel for varying the fluid pressure on said second abutment, the first abutment being urged by the pressure of fluid supplied to effect an application of the brakes and the second abutment being urged by the fluid pressure which is proportional to the speed of the vehicle wheel to move in a direction to effect movement of the valve means to open the communication through which fluid is supplied to the brake cylinder, movement of said valve device in this direction being opposed by the pressure of the fluid in the brake cylinder on the first abutment.

5. In a fluid pressure brake for a vehicle, the combination with a brake cylinder, of manually controlled means for effecting the supply of fluid under pressure to the brake cylinder, means operative to establish a fluid pressure which pressure is proportional to the speed of a vehicle wheel, a brake controlling valve device comprising valve means for controlling the supply of fluid under pressure to the brake cylinder, a first movable abutment subject to the opposing pressures of the brake cylinder and the pressure of fluid supplied to effect an application of the brakes for operating said valve means, and a second movable abutment subject to the opposing pressures of the fluid supplied to effect an application of the brakes and to said fluid pressure which is proportional to the speed of the vehicle wheel, said last named movable abutment also controlling the operation of said valve device, the brake cylinder fluid pressure operating on the first abutment and the pressure of fluid supplied to effect an application of the brakes operating on the second abutment being operable to urge said abutments in a direction to effect movement of the valve means in a direction to close the communication through which fluid is supplied to the brake cylinder, the fluid pressure proportional to the speed of the vehicle and operable on the second abutment, and the pressure of fluid supplied to effect an application of the brakes and operating on the first abutment being operable to urge said abutments in a direction to effect movement of the valve means in a direction to open the communication through which fluid is supplied to the brake cylinder.

6. In a fluid pressure brake for a vehicle, the combination with a brake cylinder, of manually controlled means for effecting the supply of fluid under pressure to the brake cylinder, means operative to establish a fluid pressure which pressure is proportional to the speed of a vehicle wheel, a brake controlling valve device comprising valve means for controlling the supply of fluid under pressure to the brake cylinder, said valve means also controlling a communication through which fluid is released from the brake cylinder, a first movable abutment subject to the opposing pressures of the brake cylinder and the pressure of the fluid supplied to effect an application of the brakes for operating said valve means, and a second movable abutment subject to the opposing pressures of the fluid supplied to effect an application of the brakes and to the fluid pressure which is proportional to the speed of the vehicle wheel, said last named abutment also controlling the operation of said valve means, the first abutment being urged by the pressure of fluid supplied to effect an application of the brakes and the second abutment being urged by the fluid pressure which is proportional to the speed of the vehicle wheel to move in a direction to effect movement of the valve means in a direction to open the communication through which fluid is supplied to the brake cylinder and to close the communication through which fluid is released from the brake cylinder, the first abutment being urged by the brake cylinder fluid pressure and the second abutment being urged by the pressure of fluid supplied to effect an application of the brakes to move in a direction to effect movement of the valve means in a direction to close the communication through which fluid is supplied to the brake cylinder and to open the communication through which fluid is released from the brake cylinder.

7. In a fluid pressure brake for a vehicle, in combination, a valve for controlling the supply of fluid under pressure to the brake cylinder, a movable abutment operated by an increase in fluid pressure for opening said valve, another movable abutment operated by an increase in fluid pressure for opening said valve, manually operated means for supplying fluid under pressure to the first abutment, and means for supplying fluid under pressure to the second abutment at a pressure corresponding with the speed of a vehicle wheel.

8. In a fluid pressure brake for a vehicle, in combination, a valve for controlling the supply of fluid under pressure to the brake cylinder, a movable abutment operated by an increase in fluid pressure for opening said valve, manually operated means for controlling the supply of fluid under pressure to and its release from the brake cylinder past said valve, another movable abutment operated by an increase in fluid pressure for opening said valve, means controlled by said manually operated means for supplying fluid under pressure to the first abutment, and means for supplying fluid under pressure to the second abutment at a pressure corresponding with the speed of a vehicle wheel.

THEOPHILE TARISIEN.